United States Patent
Jinno et al.

(10) Patent No.: US 12,397,676 B2
(45) Date of Patent: Aug. 26, 2025

(54) INFORMATION PROCESSING APPARATUS AND OCV ADJUSTMENT METHOD

(71) Applicant: HONDA MOTOR CO., LTD., Tokyo (JP)

(72) Inventors: Tatsuya Jinno, Wako (JP); Takumi Shiiyama, Wako (JP); Ryuichi Kimata, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 368 days.

(21) Appl. No.: 17/901,447

(22) Filed: Sep. 1, 2022

(65) Prior Publication Data
US 2022/0410761 A1 Dec. 29, 2022

Related U.S. Application Data

(63) Continuation of application No. PCT/JP2021/006306, filed on Feb. 19, 2021.

(30) Foreign Application Priority Data

Mar. 27, 2020 (JP) ................... 2020-057898

(51) Int. Cl.
*H02J 7/00* (2006.01)
*B60L 53/53* (2019.01)
(Continued)

(52) U.S. Cl.
CPC ............... *B60L 58/12* (2019.02); *B60L 53/53* (2019.02); *B60L 53/66* (2019.02);
(Continued)

(58) Field of Classification Search
CPC .......... B60L 58/12; B60L 53/53; B60L 53/66; B60L 2250/16; H02J 13/00001; H02J 7/00032; H02J 7/0013; H02J 7/342
See application file for complete search history.

(56) References Cited

U.S. PATENT DOCUMENTS

2011/0239445 A1 10/2011 Ibi et al.
2013/0116868 A1* 5/2013 Erko ................. B60L 53/64
320/109

(Continued)

FOREIGN PATENT DOCUMENTS

CN 109586348 A 4/2019
JP 2011-216328 A 10/2011
(Continued)

OTHER PUBLICATIONS

International Search Report dated Apr. 27, 2021, issued in counterpart International Application No. PCT/JP2021/006306, with English Translation (7 pages).
(Continued)

*Primary Examiner* — Zixuan Zhou
(74) *Attorney, Agent, or Firm* — WHDA, LLP (57) ABSTRACT

An information processing apparatus is provided. Acquisition means acquires first information regarding OCVs of a plurality of secondarily used vehicle batteries. Determination means determines a combination of the vehicle batteries based on the first information such that the OCV of the vehicle batteries falls within a target range with charging and discharging between the vehicle batteries.

13 Claims, 4 Drawing Sheets

(51) Int. Cl.
  *B60L 53/66*   (2019.01)
  *B60L 58/12*   (2019.01)
  *H02J 7/34*   (2006.01)
  *H02J 13/00*   (2006.01)

(52) U.S. Cl.
  CPC ........ *H02J 7/00032* (2020.01); *H02J 7/0013* (2013.01); *H02J 7/342* (2020.01); *B60L 2250/16* (2013.01); *H02J 13/00001* (2020.01)

(56) References Cited

U.S. PATENT DOCUMENTS

| 2016/0240898 | A1 | 8/2016 | Koba et al. |
| 2019/0242950 | A1 | 8/2019 | Kishi |
| 2019/0299811 | A1* | 10/2019 | Bryngelsson ........... B60L 58/22 |

FOREIGN PATENT DOCUMENTS

| JP | 2014-147158 A | 8/2014 |
| JP | 2015-27223 A | 2/2015 |
| JP | 2016-25782 A | 2/2016 |
| JP | 2016-152110 A | 8/2016 |
| JP | 2017-134894 A | 8/2017 |
| JP | 2019-75936 A | 5/2019 |
| WO | 2018/012151 A1 | 1/2018 |

OTHER PUBLICATIONS

Wang Zhifu et al., "A Electric Drive Theory and Design of Electric Vehicles", Beijing: Mechanical Industry, 2017, Cited in CN Office Action dated Apr. 1, 2025. (6 pages).

Office Action dated Apr. 1, 2025, issued in counterpart CN Application No. 202180018185.7, with English translation. (26 pages).

* cited by examiner

COMBINATION OF BATTERIES IS DETERMINED.
PERFORM CHARGE AND DISCHARGE BETWEEN VEHICLES.

| DISCHARGE → | CHARGE | AMOUNT OF DISCHARGE |
|---|---|---|
| BATTERY 2A (VEHICLE VA) | BATTERY 2D (VEHICLE VD) | X1 [Ah] |
| BATTERY 2C (VEHICLE VC) | BATTERY 2B (VEHICLE VB) | X2 [Ah] |

DISCHARGE X1 [Ah] TO VEHICLE VD — 4a

FIG. 5B

CHARGE X1 [Ah] FROM VEHICLE VA — 4d

INFORMATION PROCESSING APPARATUS AND OCV ADJUSTMENT METHOD

CROSS-REFERENCE TO RELATED APPLICATION(S)

This application is a continuation of International Patent Application No. PCT/JP2021/006306 filed on Feb. 19, 2021, which claims priority to and the benefit of Japanese Patent Application No. 2020-057898 filed on Mar. 27, 2020, the entire disclosures of which are incorporated herein by reference.

BACKGROUND OF THE INVENTION

Field of the Invention

The present invention relates to an information processing apparatus and an OCV adjustment method

Description of the Related Art

A technique for equalizing a state of charge (SOC) of each block of an assembled battery including a plurality of blocks is known for a battery used for an electric vehicle such as an electric vehicle (Japanese Patent Laid-Open No. 2019-75936)

SUMMARY OF THE INVENTION

According to an embodiment of the present invention, there is provided an information processing apparatus comprising: acquisition unit configured to acquiring first information regarding OCVs of a plurality of secondarily used vehicle batteries; and determination unit configured to determining a combination of the vehicle batteries based on the first information such that the OCV of the vehicle batteries falls within a target range with charging and discharging between the vehicle batteries.

Further features of the present invention will become apparent from the following description of exemplary embodiments (with reference to the attached drawings).

DESCRIPTION OF THE EMBODIMENTS

When batteries used in electric vehicles are removed from vehicle bodies and used for a secondary use, the batteries removed from a plurality of vehicles may be connected to each other. In connection between the batteries, it is necessary to adjust an open circuit voltage (OCV) of each battery, but there is room for improvement in an adjustment method of the OCV.

An embodiment of the present invention provides a technique for efficiently performing OCV adjustment of a battery.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<System Configuration>

Figure 1:
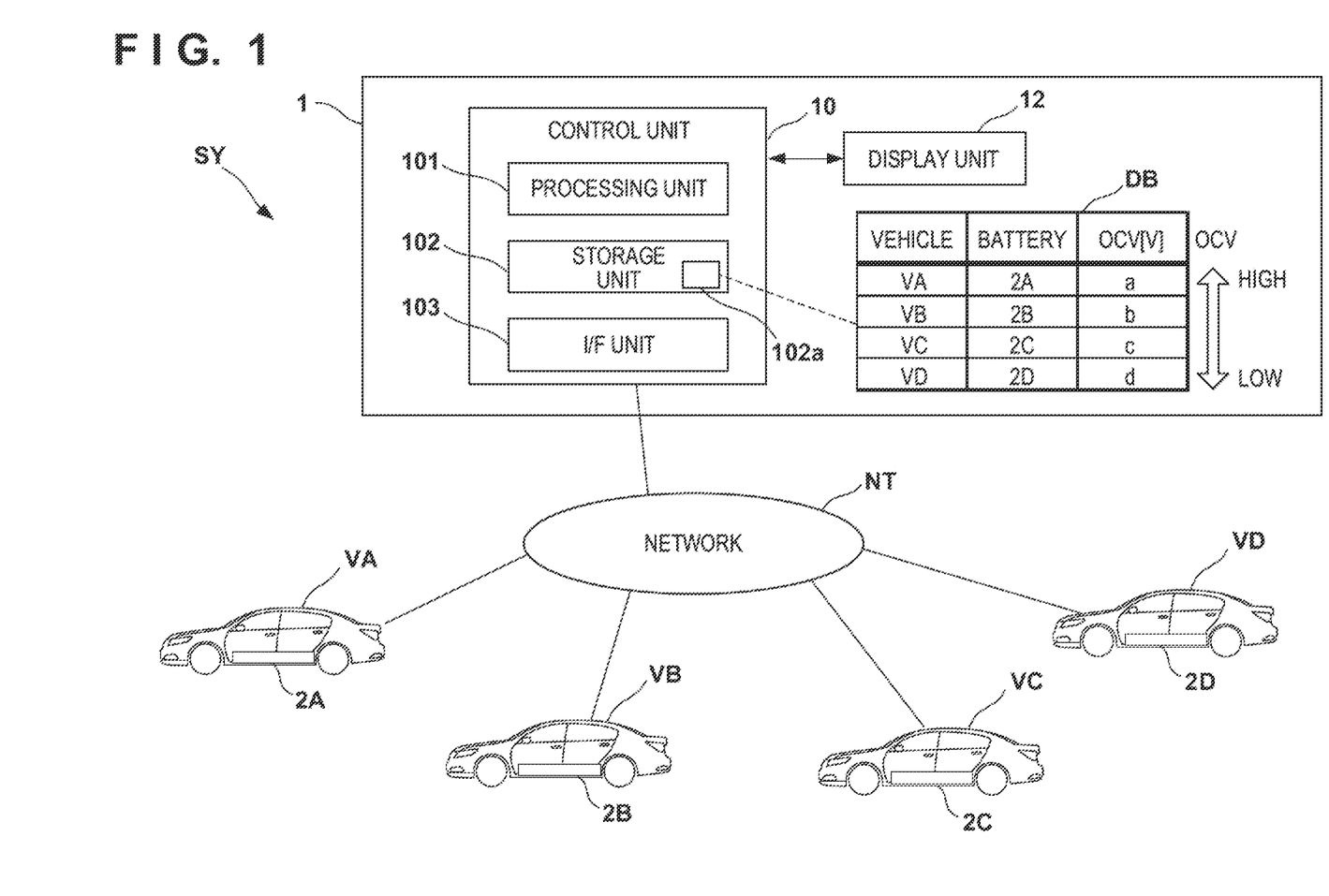
FIG. 1 is a diagram illustrating a configuration example of an OCV adjustment system according to one embodiment.

FIG. 1 is a diagram illustrating a configuration example of an OCV adjustment system SY (hereinafter, referred to as a system SY) according to one embodiment. The system SY is a system for adjusting the OCV of a vehicle battery removed when the vehicle battery mounted and used in an electric vehicle typified by an electric vehicle is removed from a vehicle body and used for secondary use. In the present embodiment, the system SY includes an information processing apparatus 1 and a battery 2 (vehicle battery) mounted in the vehicle V. Although vehicles VA to VD are illustrated in FIG. 1, they may be collectively referred to as a vehicle V in the following description. In addition, although the batteries 2A to 2D mounted in the vehicles VA to VD, respectively, are illustrated in FIG. 1, they may be collectively referred to as the battery 2 in the following description.

The information processing apparatus 1 adjusts the OCV of the battery 2 when the battery 2 is secondarily used. The information processing apparatus 1 includes a control unit 10 and a display unit 12. The control unit 10 includes a processing unit 101, a storage unit 102, and an I/F unit 103 (interface unit). Note that it is also possible to adopt a configuration in which the display unit is provided separately from the information processing apparatus 1 or the display unit is omitted.

The processing unit 101 is a processor represented by a central processing unit (CPU), and executes a program stored in the storage unit 102. The storage unit 102 is a RAM, a ROM, or the like and stores data or the like used for processing by the processing unit 101 in addition to the program executed by the processing unit 101. The I/F unit 103 relays transmission and reception of signals between an external device and the processing unit 101.

In the present embodiment, the I/F unit 103 includes a communication I/F, and the vehicle V includes a communication device capable of network communication. The processing unit 101 causes the I/F unit 103 to transmit and receive signals to and from the vehicle V via the network NT such as the Internet.

In addition, the storage unit 102 includes a storage area 102a, and the storage area 102a stores a database DB for managing information on the vehicle V and the battery 2 mounted therein. In the present embodiment, a vehicle name, a battery name, and the OCV of the battery are managed in association with each other. The vehicle name and the battery name may be, for example, unique identification numbers of the vehicle V and the battery 2. The processing unit 101 acquires information managed by the database DB by communicating with the vehicle V. Note that, in the database DB, information and the like regarding other batteries 2 may be managed.

Figure 2:
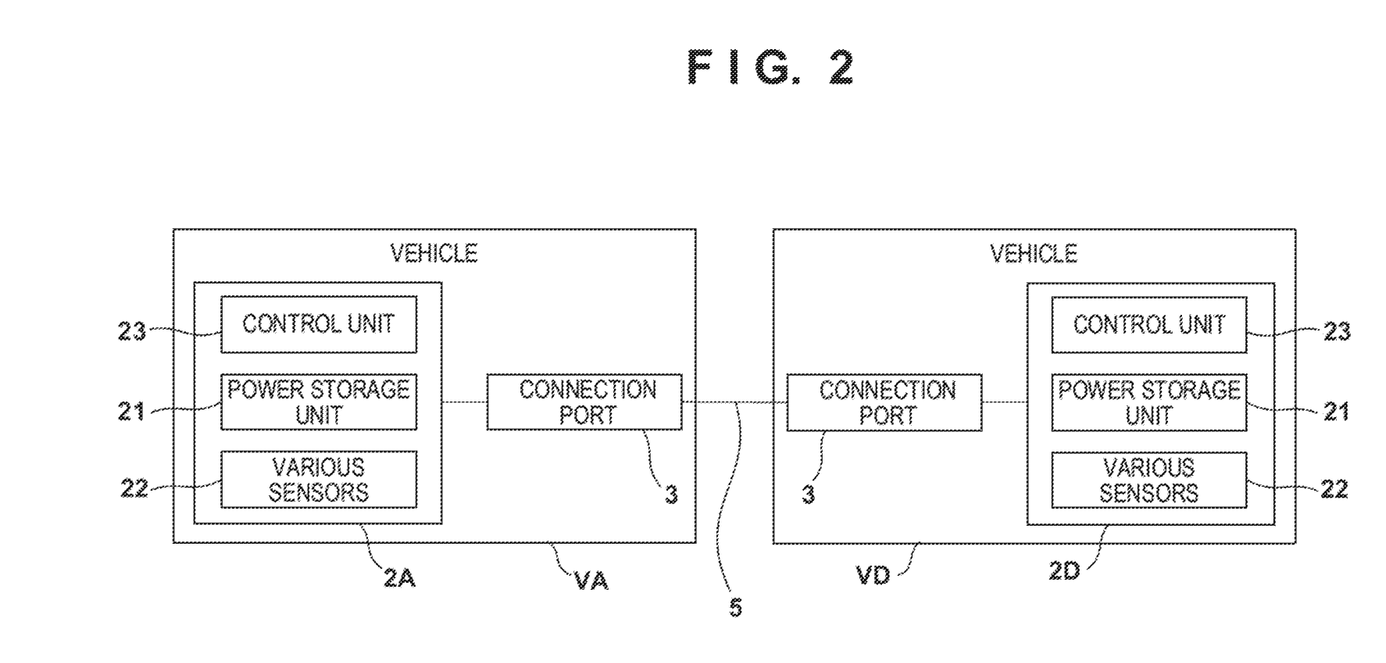
FIG. 2 is a diagram illustrating an example of a hardware configuration of a vehicle and a battery mounted in the vehicle.

FIG. 2 is a diagram illustrating an example of a hardware configuration of the vehicle V and the battery 2 mounted in the vehicle V, and illustrates a configuration in a case where charging and discharging are performed between vehicles (the vehicle VA and the vehicle VD). The vehicle V includes the battery 2 and a connection port 3 through which the battery 2 exchanges electricity with an external power supply apparatus or another vehicle. Note that a known technique can be applied to the configuration of charging and discharging between the vehicles, and a current can flow from one vehicle V to the other vehicle V by connecting the two vehicles V via an electrical connection member 5. In addition, the battery 2 mounted in the vehicle V includes a power storage unit 21, various sensors 22, and a control unit 23.

The power storage unit 21 stores electricity. The power storage unit 21 is configured by, for example, connecting a plurality of battery cells in series or in parallel. In one embodiment, the power storage unit 21 may be a lithium ion battery.

The various sensors 22 detect the state of the power storage unit 21. For example, the various sensors 22 include a temperature sensor that detects the temperature of the battery cell, a voltage sensor that detects the voltage of the battery cell, a current sensor that detects the current in the circuit, and the like.

The control unit 23 controls charging and discharging of electricity stored in the power storage unit 21. The control unit 23 includes, for example, a processor such as a CPU, a memory such as a RAM or a ROM, an interface that relays transmission and reception of signals to and from the outside, and the like. The control unit 23 controls charging and discharging of electricity stored in the power storage unit 21 based on detection results of the various sensors 22. Furthermore, the control unit 23 may estimate a state of charge (SOC) or a state of health (SOH) of the battery cell based on the detection results of the various sensors 22. Note that a well-known technique can be applied as an SOC or SOH estimation method.

<Secondary Use of Vehicle Battery>

The battery 2 (vehicle battery) may be used in the vehicle V and then detached from the vehicle body for secondary use. Here, depending on the battery capacity required at the secondary usage destination, there is case where the battery 2 for one vehicle V is not enough capacity. In such a case, for example, a plurality of batteries 2 removed from a plurality of vehicles V may be combined and provided to the secondary usage destination as one unit.

On the other hand, since the OCV of the battery 2 when the battery is detached from the vehicle V is different for each vehicle, if the batteries 2 detached from the plurality of vehicles V are connected as they are, a large current may flow at the time of connection. From the viewpoint of protecting the battery 2 or other components, it is desirable to suppress a large current from flowing through the circuit.

Here, in order to match the OCVs of the batteries 2 to be combined, it is conceivable to adjust the OCV of each battery 2, but the workload at the time of battery combination may increase.

Therefore, in the present embodiment, the OCV adjustment of the battery 2 is efficiently performed when the batteries 2 detached from the plurality of vehicles V are connected and secondarily used by the processing described below of the information processing apparatus 1.

Processing Example of Information Processing Apparatus

Figure 3:
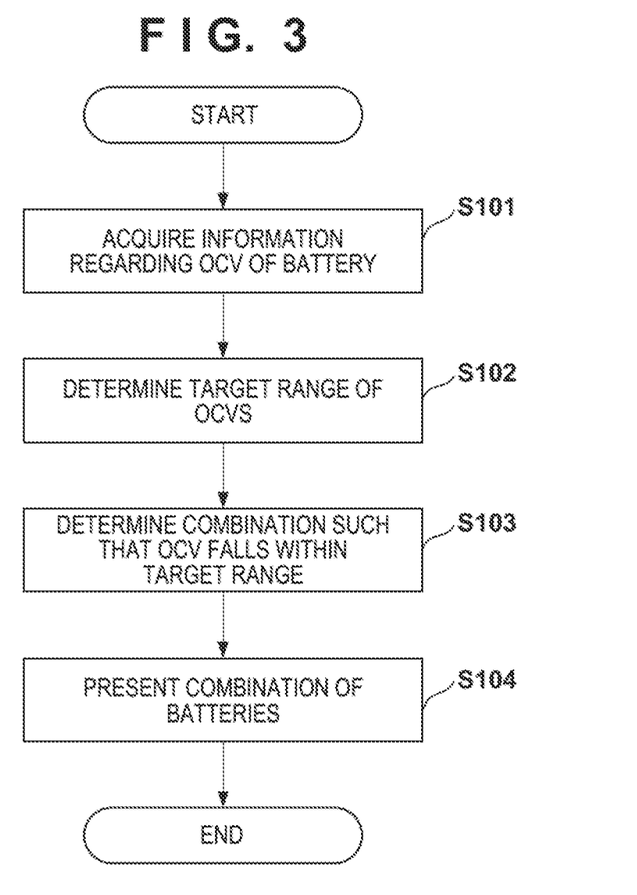
FIG. 3 is a flowchart illustrating a processing example of a processing unit of an information processing apparatus.

FIG. 3 is a flowchart illustrating a processing example of the processing unit 101 of the information processing apparatus 1. This processing example is realized, for example, by the processing unit 101 reading and executing a program stored in the storage unit 102.

This processing example shows an example of processing of determining a combination of the batteries 2 when the batteries 2 mounted on the plurality of vehicles V are combined and provided to the secondary use destination. In the following description, a case where the four batteries 2A to 2D are combined two by two to be unitized will be described based on the example of FIG. 1. However, the present processing example may be applied to five or more batteries 2. In addition, the present processing example can also be applied to a case where three or more batteries 2 are combined into one unit.

In S101, the processing unit 101 acquires information regarding the OCV of the battery 2. In the example of FIG. 1, the processing unit 101 communicates with the vehicles VA to VD to acquire information regarding the OCVs of the plurality of secondarily used batteries 2A to 2D. The information regarding the OCV may be the value of the OCV detected by the voltage sensor as the various sensors 22, that is, the voltage value itself, or may be other information from which the OCV can be estimated.

Note that, in a case where the battery 2 includes a communication device or the like capable of communicating with the information processing apparatus 1, the information processing apparatus 1 and the battery 2 may directly communicate with each other without passing through the vehicle V to exchange information. For example, the processing unit 101 manages the acquired information in the database DB. In addition, in the example of FIG. 1, the processing unit 101 communicates with the vehicle V via the network NT, but the processing unit 101 may directly communicate with the vehicle V by wired connection or wireless connection.

In S102, the processing unit 101 determines the target range of the combined OCVs. In the present embodiment, the processing unit 101 calculates an average value of the OCVs of the batteries 2A to 2D to be combined based on the information regarding the OCVs of the plurality of batteries 2 acquired in S101, and sets a range including the average value as a target range. The range including the average value may be set by Y−y to Y+y, for example, in a case where the average value of the OCV is Y and the difference from the allowable average value is y.

In S103, the processing unit 101 determines the combination of the batteries 2A to 2D such that the OCV of the battery 2 falls within the target range determined in S102 by charging and discharging of the batteries 2.

In the example of FIG. 1, the OCV of the battery 2 is higher in the order of the batteries 2A, 2B, 2C, and 2D. Therefore, the processing unit 101 can set each of (1) the battery 2A and the battery 2D, and (2) the battery 2B and the battery 2C as a combination candidate such that the OCV equalized by charging and discharging between the combined batteries 2 approaches the average value. Then, in a case where the OCV after charging and discharging of the battery 2A and the battery 2D equalized by charging and discharging between the battery 2A and the battery 2D falls within the target range, the processing unit 101 determines to combine the battery 2A and the battery 2D. Similarly, in a case where the OCV after charging and discharging of the battery 2B and the battery 2C equalized by charging and discharging between the battery 2B and the battery 2C falls within the target range, the processing unit 101 determines to combine the battery 2B and the battery 2C.

Figure 4:
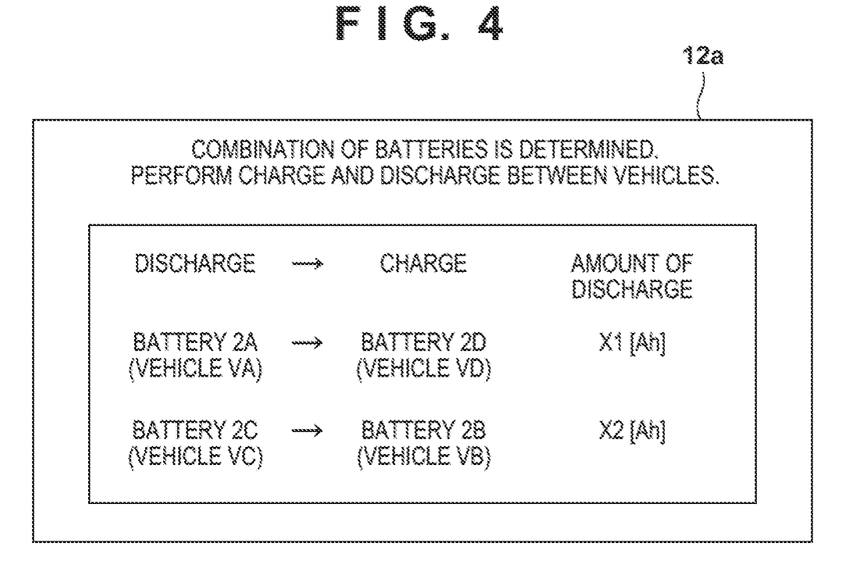
FIG. 4 is a diagram illustrating a configuration example of a screen to be displayed on a display unit of the information processing apparatus.

In S104, the processing unit 101 presents information regarding the combination of the batteries 2 determined in S103. For example, the processing unit 101 displays information regarding the combination of the batteries 2 on the display unit 12 of the information processing apparatus 1. FIG. 4 is a diagram illustrating a configuration example of a screen 12a displayed on the display unit 12. The screen 12a can include, as the information regarding the combination of the batteries 2, information regarding the combination of the batteries 2 and a charge/discharge relationship between the combined batteries. In addition, the screen 12a may include information regarding the vehicle V on which the battery 2 to be combined is mounted. In the example of FIG. 4, combining the battery 2A mounted in the vehicle VA and the battery 2D mounted in the vehicle VD, and discharging X1 [Ah] from the battery 2A to the battery 2D as a charge/discharge relationship between the batteries are presented. The OCV depends on the amount of electricity (storage amount) stored in the power storage unit 21 of the battery 2. Therefore, by causing a current to flow from the battery 2A having a high OCV to the battery 2D having a low OCV, that is, by discharging from the battery 2A to the battery 2D, the OCVs of the battery 2A and the battery 2D can be averaged. In one embodiment, the processing unit 101 may acquire information indicating the relationship between the OCV and the storage amount of the control unit 23 of the battery 2, and determine the amount of electricity to be charged and discharged between the batteries 2 based on the relationship and the value of the OCV.

Figure 5A:
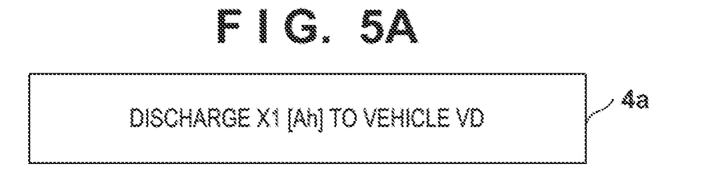
FIG. 5A is a diagram illustrating a configuration example of a screen to be displayed on a display unit such as a monitor of a vehicle.
Figure 5B:
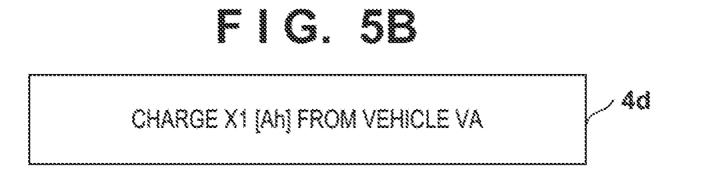
FIG. 5B is a diagram illustrating a configuration example of a screen to be displayed on a display unit such as a monitor of a vehicle.

Note that the processing unit 101 may also present the information regarding the combination of the batteries 2 by displaying the information also on the vehicle V side. FIG. 5A is a diagram illustrating a configuration example of a screen 4a displayed on a display unit such as a monitor of the vehicle VA, and FIG. 5B is a diagram illustrating a configuration example of a screen 4d displayed on a display unit such as a monitor of the vehicle VD. FIGS. 5A and 5B present the name of the vehicle V equipped with the battery 2 combined with the battery 2 mounted on a self-vehicle, and the charge/discharge relationship. Since the information regarding the combination of the batteries 2 is presented on the vehicle V side, the worker can more easily obtain the information regarding the combination of the batteries 2 in a case where the worker moves the vehicle V based on the combination of the batteries 2.

<Operation Mode of System>

An example of an operation mode of the system SY using the processing of the information processing apparatus 1 illustrated in FIG. 3 will be described. A battery provider who collects the batteries 2, combines the collected batteries, and provides the batteries to the secondary usage destination executes the processing of the information processing apparatus 1 illustrated in FIG. 3 in a state where a large number of the vehicles V collected from the vehicle users and the like are collected in the same place.

Then, the battery provider performs discharge and charge of the batteries 2 via the connection port 3 of the vehicle V in a state where the battery 2 is mounted in the vehicle V based on the combination of the batteries 2 determined by the processing of FIG. 3 (see FIG. 2).

Thereafter, the battery provider removes the battery 2 from the vehicle body, combines the batteries 2, and provides the batteries 2 to the secondary user.

As described above, according to the present embodiment, the combination of the batteries 2 is determined so that the OCV falls within the target range. Therefore, since the OCV adjustment is completed by performing charging and discharging between the vehicles V according to the determined combination, it is not necessary to perform the OCV adjustment on each of the batteries 2, and the OCV adjustment between the batteries 2 can be performed more efficiently. In addition, since it is not necessary to discharge the electricity stored in the battery 2 to the outside for the OCV adjustment, the electricity remaining in the battery 2 at the time of collecting the vehicle V can be used without waste. In addition, since the batteries 2 to be combined are combined after the OCVs of the batteries 2 to be combined are equalized, it is possible to suppress a large current from flowing through the circuit at the time of connection.

In addition, according to the present embodiment, since charging and discharging of the batteries 2 are performed via the vehicle V, the OCV adjustment of the battery 2 can be performed with a simple configuration without requiring separate charging and discharging, measurement equipment, and the like.

The target range of the OCV can be set as appropriate. For example, the predetermined range may be used instead of the average value of the acquired OCV values. For example, it is conceivable that the desired initial OCV value varies depending on the use of the battery or the installation mode of the battery at the secondary usage destination. Therefore, the range of the OCV corresponding to the secondary use destination may be set as the target range.

In the processing of S103, the processing unit 101 may exclude a part of the battery 2 for which the information regarding the OCV has been acquired in S101 from the combination target. For example, in a case where there is a battery 2 that cannot keep the OCV within the target range even when combined with another battery 2 due to the reason that the OCV is extremely high or low, the processing unit 101 may exclude the battery 2 from the combination target.

Other Embodiments

In the above embodiment, a four-wheel electric vehicle is exemplified as the vehicle V, and the battery 2A mounted on the four-wheel electric vehicle is exemplified. However, the configuration according to the above embodiment can also be applied to a battery of another moving body such as a battery mounted on a straddle type electric vehicle or the like, a battery detachably used in an electric scooter or the like, or a battery used in an electric work machine such as an electric cultivator or an electric tractor.

Summary of Embodiments

The above embodiments disclose at least the following information processing apparatus and OCV adjustment method.

An information processing apparatus (e.g., 1) of the above embodiments comprising:
 an acquisition unit (e.g., 101, S101) configured to acquire first information regarding OCVs of a plurality of secondarily used vehicle batteries; and
 a determination unit (e.g., 101, S103) configured to determine a combination of the vehicle batteries based on the first information such that the OCV of the vehicle batteries falls within a target range with charging and discharging between the vehicle batteries.

According to this embodiment, since the combination of batteries is determined so that the OCV after charging and discharging between the batteries falls within the target range, the OCV adjustment of the batteries can be efficiently performed.

2. According to the above embodiment, the target range is a range including an average value of the OCVs of the plurality of vehicle batteries.

According to this embodiment, the values of the OCVs of the batteries after being combined can be equalized.

3. According to the above embodiment, the acquisition unit acquires information regarding the OCV via the vehicle in a state where the vehicle battery is mounted in the vehicle.

According to this embodiment, in a case where the vehicle battery itself does not have a configuration for communicating with the information processing apparatus, the information processing apparatus can acquire information on the battery via the vehicle.

4. According to the above embodiment, the information processing apparatus further comprises a presentation unit (e.g., 101, S104) configured to present second information regarding the combination determined by the determination unit.

According to this embodiment, the user can easily recognize the determined combination.

5. According to the above embodiment, the second information presented by the presentation unit includes a charge/discharge relationship between the vehicle batteries.

According to this embodiment, the user can recognize the charge/discharge relationship between the batteries.

6. According to the above embodiment, the presentation unit presents the second information by causing a display unit of a vehicle on which the vehicle battery is mounted to display the second information.

According to this embodiment, a worker can more easily obtain the information regarding the combination of the vehicle batteries.

7. An OCV adjustment method of the above embodiments is an OCV adjustment method of a vehicle battery to be used in a combination of a plurality of vehicle batteries for secondary use, the method comprising:
acquiring (e.g., S101), by a computer, information regarding OCVs of the plurality of secondarily used vehicle batteries; and
determining (e.g., S103), by a computer, a combination of the vehicle batteries based on the information regarding the OCV such that the OCV of the vehicle batteries falls within a target range with charging and discharging between the vehicle batteries.

According to this embodiment, since the combination of batteries is determined so that the OCV after charging and discharging between the batteries falls within the target range, the OCV adjustment of the batteries can be efficiently performed.

The invention is not limited to the foregoing embodiments, and various variations/changes are possible within the spirit of the invention.

What is claimed is:

1. An information processing apparatus comprising:
an acquisition unit configured to acquire first information regarding open circuit voltages of a plurality of secondarily used vehicle batteries mounted in a plurality of vehicles, respectively; and
a determination unit configured to determine a combination of a plurality of vehicle batteries from the plurality of secondarily used vehicle batteries mounted in the plurality of vehicles based on the first information such that each open circuit voltage of the plurality of vehicle batteries of the combination falls within a target range with charging and discharging between the plurality of vehicle batteries of the combination,
wherein the acquisition unit acquires information regarding the open circuit voltages via the plurality of vehicles in a state where the plurality of secondarily used vehicle batteries are mounted in the plurality of vehicles, respectively.

2. The information processing apparatus according to claim 1, wherein the target range is a range including an average value of the open circuit voltages of the plurality of secondarily used vehicle batteries.

3. The information processing apparatus according to claim 1, further comprising
a presentation unit configured to present second information regarding the combination determined by the determination unit.

4. The information processing apparatus according to claim 3, wherein the second information presented by the presentation unit includes a charge/discharge relationship between the plurality of vehicle batteries of the combination.

5. The information processing apparatus according to claim 4, wherein the presentation unit presents the second information on a display unit of a vehicle of a vehicle in the plurality of vehicles.

6. The information processing apparatus according to claim 1, the plurality of vehicle batteries of the combination are scheduled to be used after the being detached from vehicles in which the plurality of vehicle batteries of the combination are mounted.

7. An information processing apparatus comprising:
an acquisition unit configured to acquire first information regarding open circuit voltages of a plurality of secondarily used vehicle batteries mounted in a plurality of vehicles, respectively;
a determination unit configured to determine a combination of a plurality of vehicle batteries from the plurality of secondarily used vehicle batteries mounted in the plurality of vehicles based on the first information such that each open circuit voltage of the plurality of vehicle batteries of the combination falls within a target range with charging and discharging between the plurality of vehicle batteries of the combination; and
a presentation unit configured to present second information regarding the combination determined by the determination unit on a display unit of the information processing apparatus or a display unit of a vehicle in the plurality of vehicles.

8. The information processing apparatus according to claim 7, wherein the second information presented by the presentation unit includes a charge/discharge relationship between the vehicle batteries.

9. The information processing apparatus according to claim 8, wherein the presentation unit presents the second information by causing the display unit of a vehicle on which the vehicle battery is mounted to display the second information.

10. An open circuit voltage adjustment method of a vehicle battery to be used in a combination of a plurality of vehicle batteries for secondary use, the method comprising:

acquiring, by a computer, information regarding open circuit voltages of a plurality of secondarily used vehicle batteries mounted in a plurality of vehicles, respectively; and determining, by the computer, a combination of a plurality of vehicle batteries from the plurality of secondarily used vehicle batteries mounted in the plurality of vehicles based on the information regarding the open circuit voltages such that each open circuit voltage of the plurality of the vehicle batteries of the combination falls within a target range with charging and discharging between the plurality of vehicle batteries of the combination, wherein the acquiring acquires information regarding the open circuit voltages via the plurality of vehicles in a state where the plurality of secondarily used vehicle batteries are mounted in the plurality of vehicles, respectively.

11. An open circuit voltage adjustment method of a vehicle battery to be used in a combination of a plurality of vehicle batteries for secondary use, the method comprising:

acquiring, by a computer, information regarding open circuit voltages of a plurality of secondarily used vehicle batteries mounted in a plurality of vehicles, respectively;

determining, by the computer, a combination of a plurality of vehicle batteries from the plurality of secondarily used vehicle batteries mounted in the plurality of vehicles based on the information regarding the open circuit voltages such that each open circuit voltage of the plurality of vehicle batteries of the combination falls within a target range with charging and discharging between the plurality of vehicle batteries of the combination; and presenting second information regarding the combination determined by the determining on a display unit provided with the computer or a display unit of a vehicle in the plurality of vehicles.

12. A non-transitory computer-readable storage medium storing a program for causing a computer to execute an open circuit voltage adjustment method of a vehicle battery to be used in a combination of a plurality of vehicle batteries for secondary use, the method comprising:

acquiring information regarding open circuit voltages of a plurality of secondarily used vehicle batteries mounted in a plurality of vehicles, respectively; and determining a combination of a plurality of vehicle batteries from the plurality of secondarily used vehicle batteries mounted in the plurality of vehicles based on the information regarding the open circuit voltages such that each open circuit voltage of the plurality of the vehicle batteries of the combination falls within a target range with charging and discharging between the plurality of vehicle batteries of the combination, wherein the acquiring acquires information regarding the open circuit voltages via the plurality of vehicles in a state where the plurality of secondarily used vehicle batteries are mounted in the plurality of vehicles, respectively.

13. A non-transitory computer-readable storage medium storing a program for causing a computer to execute an open circuit voltage adjustment method of a vehicle battery to be used in a combination of a plurality of vehicle batteries for secondary use, the method comprising:

acquiring information regarding open circuit voltages of a plurality of secondarily used vehicle batteries mounted in a plurality of vehicles, respectively;

determining a combination of a plurality of vehicle batteries from the plurality of secondarily used vehicle batteries mounted in the plurality of vehicles based on the information regarding the open circuit voltages such that each open circuit voltage of the plurality of vehicle batteries of the combination falls within a target range with charging and discharging between the plurality of vehicle batteries of the combination; and presenting second information regarding the combination determined by the determining on a display unit provided with the computer or a display unit of a vehicle in the plurality of vehicles.

\* \* \* \* \*